United States Patent [19]
Black et al.

[11] 3,981,157
[45] Sept. 21, 1976

[54] AUTOMOTIVE AIR CONDITIONING SYSTEM WITH VARIABLE SPEED TRACTION DRIVE TRANSMISSION

[75] Inventors: Dennis A. Black, Dayton; Byron L. Brucken, Miamisburg, both of Ohio

[73] Assignee: General Motors Corporation, Detroit, Mich.

[22] Filed: May 1, 1975

[21] Appl. No.: 573,613

[52] U.S. Cl. ................................................ 62/243
[51] Int. Cl.² ............................................. B60H 3/04
[58] Field of Search ............................ 62/243, 228

[56] References Cited
UNITED STATES PATENTS

| | | | |
|---|---|---|---|
| 2,107,341 | 2/1938 | Peo | 62/243 |
| 2,910,839 | 11/1959 | Adams | 62/243 |
| 3,062,020 | 11/1962 | Heidorn | 62/243 |
| 3,226,938 | 1/1966 | Hanson | 62/243 |
| 3,230,730 | 1/1966 | Hanson | 62/243 |

*Primary Examiner*—Lloyd L. King
*Attorney, Agent, or Firm*—J. C. Evans

[57] ABSTRACT

An automotive air conditioning system including series connected condenser, expansion valve and evaporator components having refrigerant supplied thereto by a mechanical refrigerant compressor; the refrigerant compressor includes a drive shaft connected to the output of a variable speed traction drive transmission having an input shaft connected to a belt pulley for drive from the vehicle engine. The transmission includes a compact carriage that supports friction cones at opposite ends thereof and includes an axially adjustable speed transfer spool for bridging first and second pluralities of friction cones on either end of the carriage to vary the power transfer from the input shaft to an output shaft so as to manually adjust the circulation of refrigerant flow through the system in accordance with ambient temperature conditions.

3 Claims, 4 Drawing Figures

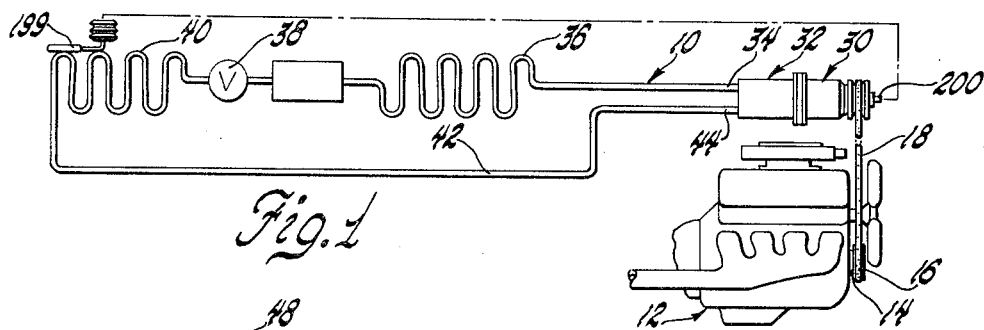
Fig. 1
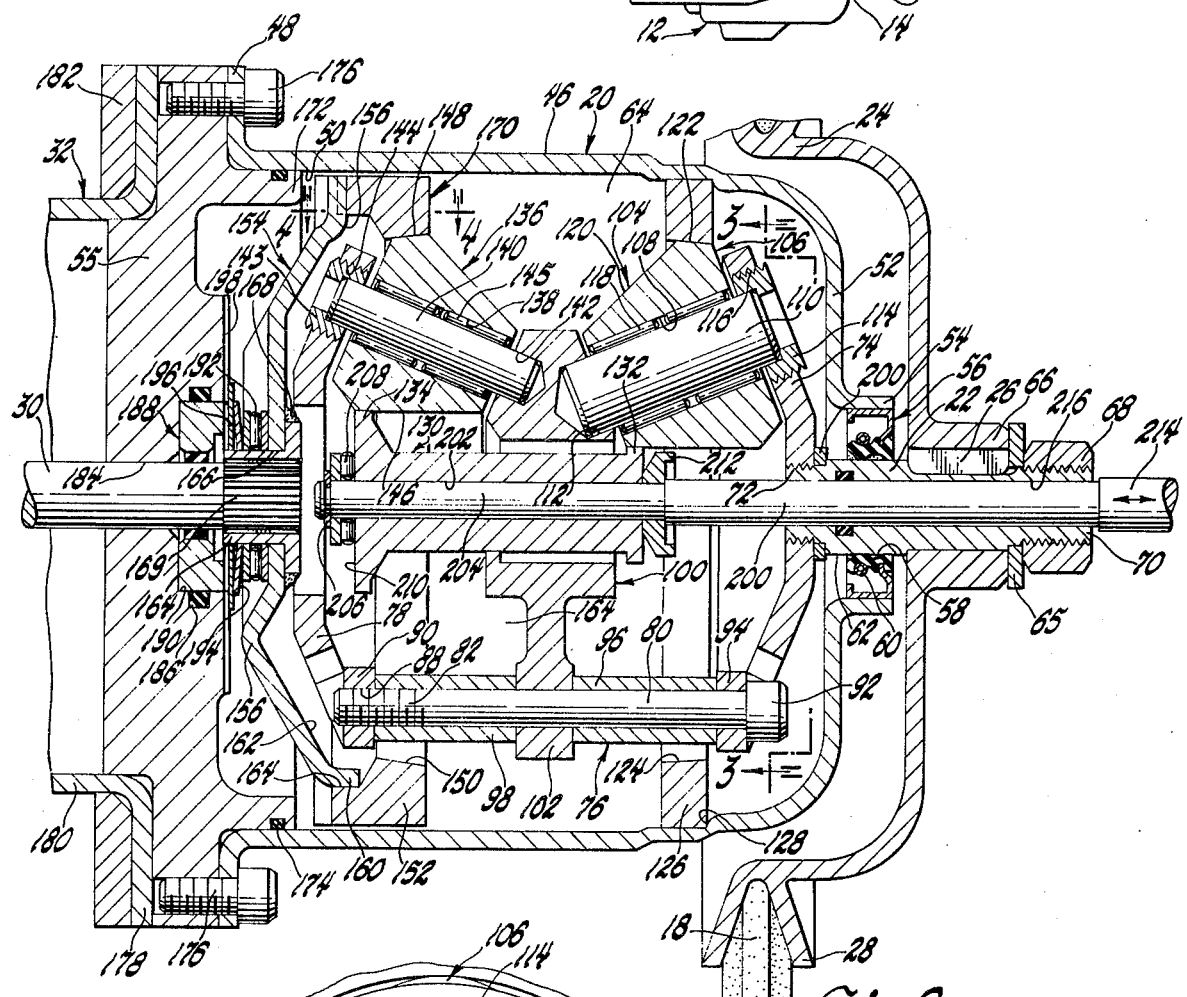
Fig. 2
Fig. 3
Fig. 4

3,981,157

AUTOMOTIVE AIR CONDITIONING SYSTEM WITH VARIABLE SPEED TRACTION DRIVE TRANSMISSION

This invention relates to automotive air conditioning systems and more particularly to automotive air conditioning systems having mechanical means for varying the operating speed of a mechanical compressor to adjust the coolant supply through an evaporator for cooling the vehicle in accordance with operator preferance.

Various proposals have been suggested for regulating the amount of coolant circulating through a refrigerant system for cooling a passenger compartment of a motor vehicle. For example, variable speed pulley systems have been located between the engine of a motor vehicle and the input shaft of a mechanical compressor to vary the speed of operation of the compressor to produce a reduced circulation of refrigerant under reduced ambient temperature conditions and an increased flow of coolant under increased ambient conditions thereby to regulate cooling of a passenger compartment in accordance with ambient conditions. Another approach has been that of varying the volumetric displacement of a mechanical compressor to produce a reduced amount of displacement when the outside temperature is low and to produce an increased amount of coolant displacement under conditions of high ambient operation.

Yet another approach to control of the amount of coolant circulation in a refrigerant system for a passenger compartment of an engine driven motor vehicle has been that of including automatically adjusted and controlled valves in the refrigerant system for maintaining a controlled refrigerant flow through the system to regulate the temperature condition at the evaporator of the vehicle to prevent ice formation thereon. The mechanical compressor for circulating coolant in such systems, however, is driven at speed of operation corresponding to that of the engine and thereby can cause an excessive amount of coolant to be circulated under certain operating conditions.

An object of the present invention is to provide an improved regrigerant system for cooling the passenger compartment of a vehicle wherein a friction cone transmission is interposed between an output shaft from a drive engine and the input shaft of a mechanical compressor including a compact arrangement of components easily located under the hood of a motor vehicle and including adjustable means to control the output speed from the transmission so as to operate the mechanical compressor of the refrigerant system to produce an optimized cooling of a passenger compartment.

Another object of the present invention is to provide an improved compact variable speed traction drive transmission including a pulley driven input shaft connected to a planet carrier having opposite end plates each supporting a plurality of friction cones thereon, a first plurality of friction cones on one end plate being operatively associated with a first fixed reaction ring and a second plurality of friction cones on an opposite end plate being operatively connected with a movable reaction ring connected to an output shaft and wherein a movable speed control spool is located coaxially within the carrier and is adjustable with respect to the first and second plurality of friction cones and operatively associated therewith to vary the power transfer from the input shaft to the output shaft so as to control the input speed to the compressor for regulating the amount of passenger compartment cooling.

Another object of the present invention is to provide an improved, variable speed transmission for use in automobile air conditioning systems including an input shaft adapted to be driven off of a power take-off shaft on a vehicle engine and coupled to a friction drive cone carrier including means operative to produce a controlled power transfer from the input shaft to the output shaft; the transmission further including an output shaft that is driven at a speed reduced from that of the input shaft for operating a mechanical compressor in an automotive air conditioning system at a speed of operation that controls the rate of regrigerant circulation in the system to optimize the cooling of a passenger compartment in accordance with ambient conditions.

Further objects and advantages of the present invention will be apparent from the following description, reference being had to the accompanying drawings wherein a preferred embodiment of the present invention is clearly shown.

FIG. 1 is a diagrammatic view of an automotive air conditioning system including the present invention;

FIG. 2 is a longitudinal sectional view of a variable speed transmission in accordance with the present invention;

FIG. 3 is a vertical sectional view taken along the line 3—3 of FIG. 2; and

FIG. 4 is an enlarged, fragmentary sectional view taken along the line 4—4 of FIG. 2.

Referring now to the drawing, in FIG. 1 an automotive air conditioning system is illustrated at 10 in diagrammatic circuit form. It includes a power source represented by an internal combustion engine 12 having an auxiliary power shaft 14 thereon with a pulley 16 over which a drive belt 18 passes to operate a variable speed, traction drive transmission or compressor driver 20 constructed in accordance with the present invention.

The transmission 20 includes an input shaft 22 and a traction drive pulley 24 connected to shaft 22 by means of a key 26. The sheave 28 of pulley 24 receives the belt 18 to produce an input drive to the transmission 20 which is directed therefrom through an output shaft 30 coupled to an input shaft of a mechanical refrigerant compressor 32. The refrigerant outlet of the compressor 32 is connected by means of a discharge hose 34 to a condenser 36 that is in series connection through an expansion valve 38 with the inlet to an evaporator coil 40. Suitable means (now shown) direct air across coil 40 for circulation within the passenger compartment of a vehicle. The evaporator 40 has its outlet connected by means of a return coduit 42 to the inlet 44 of the compressor 32.

In systems of the aforesaid type, the compressor 32 is driven at a variable speed controlled in accordance with evaporator conditions to circulate a variable amount of refrigerant to the system 10 to produce a cooling of the passenger compartment that is optimum for a given ambient condition. To accomplish such cooling, it is necessary to regulate the input speed of the compressor 32 to compensate for changes in the speed of operation of the engine 12.

In accordance with certain principles of the present invention, the transmission or compressor driver 20 is configured in a compact manner to be located in line with the compressor 32 within the engine compartment of a vehicle. The compressor has an unusually compact configuration and is capable of producing a wide range of output speeds to vary the drive speed of compressor 32 through a wide range of vehicle output speeds.

More particularly, the compressor driver 20 includes an outer case 46 with a radially outwardly directed flange 48 on one end thereof defining an opening 50 into the case 46. The opposite end of case 46 is closed by an end plate 52 including an axial extension 54 thereon arranged coaxially of and concentrically radially outwardly of the input shaft 22. An end plate 55 closes the opposite open end 50. The extension 54 defines a housing for a seal assembly 56 that includes a resilient seal element 58 maintained biased by means of a coil spring 60 against the outer surface 62 of input shaft 22 to seal the interior volume 64 of the driver 20 at one end thereof. The keyed traction drive pulley 24 is axially fastened to the input shaft 22 by means of a lock washer 65 located axially against the end of a pulley hub 66 and held in place thereagainst by means of a fastener nut 68 threadably received on a threaded extension 70 formed at the outboard end of the shaft 22.

The inboard end of the shaft 22 is fixedly secured by means of a threaded connection 72 to one end plate 74 of a planet carrier 76. The planet carrier 76 includes an opposite end plate 78 spaced axially of plate 74. Each of the end plates 74, 78 are concavely formed to a slightly dished configuration toward the interior 64 of the driver 20. They are interconnected by a plurality of tie rods 80 located at circumferentially spaced points on each of the end plates 74, 79. As illustrated in FIG. 2, each of the tie rods 80 includes a threaded end portion 82 threadably connected within a tapped opening 88 formed in a segment 90 of the end plate 78. They further include a heat portion 92 located in abutment with a segment 94 of the opposite end plate 74.

Each tie rod 80 is directed through a pair of tubular spacer elements 96, 98 that are located on either side of a cone support ring 100 having a plurality of radially outwardly directed arms 102 formed in a spider fashion to be fixedly secured by the spacer elements 96, 98 and tie rods 80 more or less centrally within the planet carrier 76. A first planetary train 104 is formed at one end of the carrier 76 and includes three separate friction cones 106 located at equidistant, circumferential points on the end plate 74. Each cone 106 includes a bore 108 therethrough which a roller shaft 110 is directed. One end of the shaft 110 is supported within a bore 112 formed in the ring 100 and the opposite end of each shaft 110 is axially fixed with respect to the ring bore 112 by means of an externally threaded retainer ring 114 threadably received in a tapped opening 116 in the end plate 74. A plurality of needle bearings 118 are located within the bore 108 to supportingly receive the shaft 110 to permit each of the friction cones 106 to freely rotate with respect to the axis of each shaft 110. Each friction cone 106 includes a first conical surface of revolution 120 thereon and a second conical surface of revolution 122 that is in engagement with a conical surface 124 formed on a reaction ring 126 fixedly secured to the inner surface of the outer case 46 at a support shoulder 128 thereon.

The three equidistantly supported, freely rotatable friction cones 106 will be driven at the speed of rotation of the input shaft 22 to the end plate 74. The control of speed from the input shaft 22 is produced by a control spool 130 located concentrically within the carrier 76. The spool 130 has a radially outwardly directed input flange 132 on one end thereof of a reduced radius and an enlarged diameter output flange 134 on the opposite end thereof which has a greater radius than that of the flange 132. The flange 132 is operatively engaged by a conical surface 120 on each of the friction cones 106 so as to produce rotation of the spool 130 with respect to the longitudinal axis of the input shaft 22. The large diameter flange 134 on the spool 130 is operatively associated with three equidistantly spaced friction cones 136 each of which is supported with respect to the end plate 78 of the carrier 76 for rotation therewith.

Each cone 136 has a bore 138 formed therethrough in which is located a support shaft 140 having one end thereof supportingly received in a bore 142 of the support ring 100 and the opposite end thereof supportingly retained within one end of a retainer ring 143 threadably received within a tapped bore 144 for axially locating the shaft 140 between the plate 78 and the ring 100. A plurality of needle bearings 145 are located within each bore 138 to support each of the friction cones 136 for free relative rotation with respect to the axis of each of the shafts 140. Each of the friction cones 136 includes a conical surface of revolution 146 and a second conical surface of revolution 148 that is operatively associated with a conical surface 150 on output follower race 152 that forms part of an output torque converter assembly 154. Drive is transferred from the spool 130 to the output friction cones 136 by the outer periphery of the flange 134 operatively engaging the conical surface 146 on each of the friction cones 136. A converter plate 156 includes a plurality of circumferentially spaced, axially directed risers with a ramp surface 157 as best shown in FIG. 4. Eash riser ramp surface 157 is recieved in a slight depression 158 on the outboard face of the race 152. Six equally spaced tabs 160 on the inboard face 162 of plate 156 are received by circumferential shoulder 164 of the race 152.

A splined drive bushing 164 is directed through a central opening 166 in plate 156 and includes an inboard flange welded at 168 to the plate 156. The bushing receives a splined end 169 of the output shaft 30 for directly coupling a second planet train 170 represented by the flange 134, friction cones 136 and torque converter assembly 154 to the output shaft 30.

The end plate 55 has an axial extension 172 thereon that is in the opening 50. It carries an O-ring seal 174 to seal the inner surface of the outer case 46 at the opening 50 therein. The end plate 55 is secured to the flange 48 by a plurality of circumferentially spaced studs 176. The end plate 55 may be configured to receive a flange portion 178 of a compressor housing 180. In the illustrated arrangement a fastener plate 182 is illustrated which may be secured by suitable means to the compressor driver 20 to secure the flange 180 of the housing 182 thereto.

The illustrated arrangement of the output shaft is directed through a bore 184 in the end plate 55 and an O-ring seal 186 therein engages a seal ring 188 located within a cavity 190 formed in the inner face of the end plate 55. A needle thrust bearing assembly 192 is located on the outer periphery of the bushing 164 between the outer surface of the plate 156 and a Bellville spring 194. A washer 196 spaces spring 194 with respect to a shoulder 198 on end plate 55.

The system control includes a thermal sensor means 199 on the evaporator 40 which produces axial movement of a speed control shaft 200.

Variable speed output from the converter 20 maintains a desired evaporator temperature without excessive power loss. The control spool 130 has an axial bore 202 formed therethrough for slidably receiving a control shaft extension 204. The inboard end of the shaft extension 204 is connected to a lock washer 206 for securing a thrust bearing 208 in sliding arrangement with an axial thrust surface 210 on the inboard end of the control spool 130. A retainer 212 axially fixes the control spool 130 with respect to the shaft extension 204. An outboard end 214 of the control shaft 200 extends through a longitudinal bore 216 within the input shaft 22 so that the speed control spool 130 can be shifted axially within the cavity 64 with respect to the friction cones carried by the carrier 76.

In the operating mode, when greater output of cooling from the refrigerant system is required, the speed control shaft 200 is shifted outwardly of shaft 22. The rotational input to the device 20 from the pulley 24 will correspond to the vehicle drive speed. This will cause rotation of planet carrier 76 at a speed in accordance with vehicle speed. The carrier 76 supports the three friction cones 106 which are part of the first planetary train 104. The first plurality of cones 106 are caused to rotate on their axis by rolling inside the reaction ring 126 as the carrier 76 rotates. Rotation of each of the friction cones 106 about the axis of each of their shafts 110 causes rotation to be imparted to the control spool 130 at flange 132. The control spool 130 will be free to rotate to cause a corresponding rotation of each of the friction cones 136 that are located in the planetary train 170. The friction cones 136 in the train 170 thus are subjected to two absolute simultaneous rotations represented by the following. One of the simultaneous, absolute rotations is that imparted to each of the friction cones by the planet carrier 76 and the other absolute speed of rotation is that imparted to each of the friction cones 136 by the control spool 130. The rotational output of the output race 152 is the net sum of these two rotations as imparted to the friction cones 136. The linear location of the control spool 130 effectively changes the output-to-input ratio by altering the cone radii upon which the control spool 130 is acting. Power is transmitted through the mechanism by the production of normal loads at each of the rolling interfaces defined by the conical surfaces of revolutions 120, 122 on the friction cones 106 and the conical surfaces of revolutions 146, 148 on each of the friction cones 136. These normal loads act through special traction lubricants distributed across the drive interfaces. The lubricant is within the cavity 64 so as to be free to splash onto the drive surfaces. In one preferred embodiment, Santotrac 50 oil is charged in the system having a 150 S.U.S. viscosity. This lubricant is available under the aforesaid trade name from Monsanto Company. The provision of the special lubricant allows development of tangential forces on each of the rolling elements within the transmission so as to produce a drive transfer without excessive element slip. The term "friction" as used in the aforesaid description is used with reference to the provision of such lubricant to produce a drive transfer from input to output of the traction drive assembly 20. The output member by virtue of the ramp angle configuration interposed between the plate 162 and the outboard end surface of the race 152 exerts a horizontal force from the output to the input end to load all the elements proportional to output torque. This will produce a load at each of the rolling interfaces as described above during all phases of operation, so as to ensure a sufficient normal force at all points through the drive train to produce drive speed transfer without excessive inter-element slip.

Since output speed is the resultant of two absolute velocities acting on cones 136, the driver 20 can produce a reversal of rotation in output shaft 30 in cases where the control spool is moved past a velocity equilibrium position. The cones 136 will then reversely rotate. In the refrigerant system application such reversal is not required. Hence, the limits of spool travel will be held between zero speed output position within cavity 64 and a more outboard position to produce greater compressor speed when more cooling is called for by sensor 199. However, the transmission is capable of producing both forward speed and reverse speed drive transfer in a general drive train application.

A mechanically operated clutch previously has been required in automotive air-conditioning systems to turn the compressor on and off. By provision of the above-described traction drive assembly 20 the mechanical clutch can be eliminated. Zero speed is produced by positioning the control shaft 200 in its inboard position.

While the embodiments of the present invention, as herein disclosed, constitute a preferred form, it is to be understood that other forms might be adopted.

What is claimed is:

1. An automotive air conditioning system comprising a compressor, a condenser, expansion valve means and an evaporator, means for connecting said condenser, expansion valve and evaporator in series refrigerant flow relationship, means for controlling the coolant passing through said series connected refrigerant system including a variable speed transmission including a pulley adapted to be connected to an output shaft of a vehicle engine, an input shaft connected to said pulley, a planet carrier having first and second axially spaced end plates thereon, a first plurality of friction means on one of said end plates and a second plurality of friction means on the other of said end plates, first reaction means operably associated with said first plurality of friction means, an output shaft, second reaction means on said output shaft operatively connected to said second plurality of friction means, a power transfer spool located centrally within said carriage and axially shiftable with respect to said first and second plurality of friction means for operatively varying the power transfer between said first and second plurality of friction means to control transfer of speed from said input shaft to said output shaft thereby to control the operative speed of the compressor to vary the quantity of refrigerant flow through said series connected refrigerant system.

2. An automotive air conditioning system comprising a compressor, a condenser, expansion valve means and an evaporator, means for connecting said condenser, expansion valve and evaporator in series refrigerant flow relationship, means for controlling the coolant passing through said series connected refrigerant system including a variable speed transmission having an outer case and including a pulley adapted to be connected to an output shaft of a vehicle engine, an input shaft connected to said pulley, a planet carrier having first and second axially spaced end plates thereon, a first plurality of friction means on one of said end plates and a second plurality of friction means on the other of said end plates, a reaction ring on said outer case operably associated with said first plurality of friction means, an output shaft, a torque converter having a plate secured to said output shaft with a plurality of risers formed axially thereon, a follower race with a plurality of recesses receiving said risers, said race having a cone surface operatively connected to said second plurality of friction means, a power transfer spool located centrally within said carriage and axially shiftable with respect to said first and second plurality of friction means for operatively varying the power transfer between said first and second plurality of friction means to control transfer of speed from said input shaft to said output shaft thereby to control the operative speed of the compressor to vary the quantity of refrigerant flow through said series connected refrigerant system, said risers shifting circumferentially of said follower race in response to output torque to produce increased axial contact between said first friction means, said power transfer spool and said second friction means as output torque increases.

3. A variable speed transmission for use in association with an automotive air conditioning compressor driven off a main automotive vehicle engine comprising in combination: a stationary housing, an input shaft, means rotatably supporting said input shaft within said housing at one end thereof, an input pulley connected to said input shaft outboard of said housing adapted to be driven at the main vehicle engine speed, a planet carrier having a first end plate secured to said input shaft adjacent one end of said housing and including a second end plate axially spaced from said first end plate adjacent the opposite end of said stationary housing, a first plurality of friction cones each having a first and second conical surface thereon, a pivot shaft directed through each of said first plurality of cones having one end thereof fixedly secured to said first end plate of said planet carrier, means for securing the opposite end of said pivot shaft with respect to said first end plate, a second plurality of friction cones each having first and second conical surfaces thereon, means including a pivot shaft for securing said second plurality of friction cones to the opposite end plate of said carriage for relative rotation therewith, a reaction ring secured to said stationary housing engageable with the first conical surface on each of said first plurality of cones for causing rotation of each of said cones about their respective pivot shaft, a power transfer spool located concentrically within each of said first and second plurality of friction drive cones including a reduced diameter end portion thereon frictionally engaged with the second conical surface of each of said first plurality of friction cones and including a second larger diameter end portion thereon in frictional engagement with the second conical surface on each of said second plurality of friction cones, means for axially shifting said spool with respect to said second conical surfaces to vary power coupling between said first and second plurality of friction cones, an output shaft, means for rotatably supporting said output shaft on said stationary housing, a radially outwardly directed output plate having a reaction ring secured to the outer periphery thereof, said reaction ring being in frictional engagement with the first conical surface of said second plurality of friction cones for transferring power from said second plurality of friction cones to the output shaft, said output plate including means for exerting a horizontal force on said first and second plurality of friction cones proportional to output torque to maintain the rolling interfaces between said friction cones, said reaction ring and said power transfer spool to maintain sufficient normal forces at the rolling interfaces therebetween to produce power transfer from the input shaft to the output shaft without excessive inter-element slip.

* * * * *